US009678759B2

(12) United States Patent
Kwon et al.

(10) Patent No.: US 9,678,759 B2
(45) Date of Patent: Jun. 13, 2017

(54) MULTISYSTEM AND METHOD OF BOOTING THE SAME

(71) Applicant: HANWHA TECHWIN CO., LTD., Changwon-si (KR)

(72) Inventors: Kiduk Kwon, Changwon-si (KR); Songho Lee, Changwon-si (KR); Hosung Han, Changwon-si (KR); Sunyong Jung, Changwon-si (KR); Hyundong Lee, Changwon-si (KR); Sungbong Cho, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 213 days.

(21) Appl. No.: 14/552,994

(22) Filed: Nov. 25, 2014

(65) Prior Publication Data

US 2015/0178094 A1    Jun. 25, 2015

(30) Foreign Application Priority Data

Dec. 20, 2013   (KR) ........................ 10-2013-0160702

(51) Int. Cl.
*G06F 9/44*   (2006.01)
*G06F 9/24*   (2006.01)
*G06F 15/177*   (2006.01)
*G06F 11/14*   (2006.01)
*G06F 15/80*   (2006.01)

(52) U.S. Cl.
CPC .......... *G06F 9/4405* (2013.01); *G06F 9/4401* (2013.01); *G06F 9/4403* (2013.01); *G06F 9/4406* (2013.01); *G06F 11/1417* (2013.01); *G06F 15/177* (2013.01); *G06F 15/8038* (2013.01)

(58) Field of Classification Search
CPC .. G06F 9/4401; G06F 9/4403; G06F 11/1417; G06F 15/177; G06F 9/4406; G06F 15/8038
USPC .................................................. 713/1, 2, 100
See application file for complete search history.

(56) References Cited

U.S. PATENT DOCUMENTS

| 7,765,391 | B2 | 7/2010 | Uemura et al. |
| 8,484,452 | B2 | 7/2013 | Motohama et al. |
| 2008/0307215 | A1* | 12/2008 | Willems ............... G06F 8/60 713/2 |
| 2012/0089814 | A1* | 4/2012 | Gupta ............... G06F 9/445 712/30 |

(Continued)

FOREIGN PATENT DOCUMENTS

| KR | 1999-0086858 A | 12/1999 |
| KR | 10-2008-0109708 A | 12/2008 |

(Continued)

*Primary Examiner* — Michael J Brown
(74) *Attorney, Agent, or Firm* — Sughrue Mion, PLLC (57) ABSTRACT

A method of booting a multisystem including a first core and a second core, the method includes: executing a boot loader of the first core; setting a network interface of the first core to be in an enable state; detecting the second core that is connected to the network interface of the first core; mapping a first memory of the first core to a second memory of the second core; loading a booting image of the first core and a booting image of the second core on the first memory; and transferring the booting image of the second core loaded on the first memory to the second core via a network.

21 Claims, 7 Drawing Sheets

(56) References Cited

U.S. PATENT DOCUMENTS

2012/0290763 A1 11/2012 Li
2015/0058533 A1* 2/2015 El-Batal ............... G06F 13/385
  711/103

FOREIGN PATENT DOCUMENTS

KR 10-2012-0092176 A 8/2012
KR 10-1288700 B1 8/2013

* cited by examiner

| FLASH MEMORY MAP | |
|---|---|
| MEMORY MAP | PHY ADDRESS |
| BBT : 4-Blocks | 0xFF80000 ~ 0xFFFFFFF |
| RFS | 0xDB00000 ~ 0xE600000 |
| Kernel | 0xD500000 ~ 0xDA00000 |
| Script | 0xD400000 ~ 0xD480000 |
| U-Boot | 0xD100000 ~ 0xD200000 |
| RFS | 0x3000000 ~ 0xD000000 |
| uImage | 0x0600000 ~ 0x0F00000 |
| dtb | 0x0400000 ~ 0x0500000 |
| config | 0x0100000 ~ 0x0200000 |
| u-boot-nand.bin | 0x0000000 ~ 0x0000000 |

421 → U-Boot row
411 → u-boot-nand.bin row
42 → top group (U-Boot through RFS/Kernel/Script)
41 → bottom group (RFS through u-boot-nand.bin)

FIG. 5

| MEMORY MAPPING ||||||
|---|---|---|---|---|---|
| FIRST CORE || | SECOND CORE |||
| | | | | | |
| 0xc40000000 | BAR0 | | BAR0 | 0x51000000 | |
| 0xc40800000 | BAR1 | PCIe | BAR1 | 0x40400000 | BOOT LOADER |
| 0xc41000000 | BAR2 | | BAR2 | 0x80400000 | BOOT SCRIPT |
| 0x480000000 | BAR3 | | BAR3 | 0x88000000 | KERNEL |
| | | | | 0xc1000000 | FILE SYSTEM |

MULTISYSTEM AND METHOD OF BOOTING THE SAME

CROSS-REFERENCE TO THE RELATED APPLICATION

This application claims priority from Korean Patent Application No. 10-2013-0160702, filed on Dec. 20, 2013, in the Korean Intellectual Property Office, the disclosure of which is incorporated herein in its entirety by reference.

BACKGROUND

1. Field

Apparatuses and methods consistent with exemplary embodiments relate to a multisystem and a method of booting the same.

2. Description of the Related Art

As system configurations become complicated and segmented, multisystem that has two or more central processing units (CPUs) are widely used. The CPUs independently executes an operating system and processes data. Also, the CPUs may transmit and receive data to and from one another by communicating via a wireless network or a wired network.

If a flash memory is provided in each of the CPUs to boot the CPUs, it is not only cost-inefficient, but also, management is complicated because each flash memory needs to be separately upgraded. Although a single device may help booting other devices after the single device is booted by using a flash memory, this may cause a longer booting time.

Information disclosed in this Background section was already known to the inventors before achieving the inventive concept of the present application, or is technical information acquired in the process of achieving the inventive concept. Therefore, it may contain information that does not form the prior art that is already known to the public.

SUMMARY

Exemplary embodiments provide a multisystem and a method of booting the same.

Various aspects will be set forth in part in the description which follows and, in part, will be apparent from the description, or may be learned by practice of the presented exemplary embodiments.

According to an aspect of an exemplary embodiment, there is provided a method of booting a multisystem which may include: executing a boot loader of the first core; setting a network interface of the first core to be in an enable state; detecting the second core that is connected to the network interface of the first core; mapping a first memory of the first core to a second memory of the second core; loading a booting image of the first core and a booting image of the second core on the first memory; and transferring the booting image of the second core loaded on the first memory to the second core via a network.

The network may be a Peripheral Component Interconnect express (PCIe) network.

The method may further include setting a booting register of the second core to be in an enable state in response to the transferring.

The method may further include booting a kernel of the first core in response to the transferring.

The booting may include if the second core is detected, booting the kernel of the first core in response to the transferring; and if the second core is not detected, booting the kernel of the first core in response to the loading.

The loading may include loading the booting image of the second core into a predetermined location of the first memory. The transferring may include transferring the booting image of the second core by recording the booting image of the second core, which is loaded into the predetermined location of the first memory, to a predetermined location of the second memory which is mapped to the predetermined location of the first memory.

The multisystem may further include another memory such as a flash memory. The loading may include loading the booting image of the first core and the booting image of the second core from the other memory.

According to an aspect of another exemplary embodiment, there is provided a first core connected to a second core. The first core may include: a first boot loader execution unit configured to execute a boot loader of the first core; a network activation unit configured to set a network interface of the first core to be in an enable state; a device detector configured to detect the second core that is connected to the network interface of the first core; a memory mapping unit configured to map a first memory of the first core to a second memory of the second core; a booting image loading unit configured to load a booting image of the first core and a booting image of the second core on the first memory; and a booting image transfer unit configured to transfer the booting image of the second core loaded on the first memory to the second core via a network.

The network may be a Peripheral Component Interconnect express (PCIe) network.

The first core may further include a booting register setting unit configured to set a booting register of the second core to be in an enable state in response to the transferring of the booting image of the second core to the second core via the network.

The first core may further include a first booting unit configured to boot a kernel of the first core based on the booting image of the first core.

If the second core is detected by the device detector, the first booting unit may boot the kernel of the first core in response to the transferring the booting image of the second core to the second core, and if the second core is not detected by the device detector, the first booting unit may boot the kernel of the first core after loading the booting image of the first core.

The booting image loading unit may load the booting image of the second core into a predetermined location of the first memory. The booting image transfer unit may transfer the booting image of the second core by recording the booting image of the second core, which is loaded into the predetermined location of the first memory, to a predetermined location of the second memory which is mapped to the predetermined location of the first memory.

According to an aspect of still another exemplary embodiment, there is provided a multisystem including the first core and the second core described above. The second core may include: a second boot loader execution unit configured to execute a boot loader of the second core included in the booting image of the second core in response to a booting register of the second core being set to be in an enable state; and a second booting unit configured to boot a kernel of the second core based on the booting image of the second core. Here, The first core may further include a booting register setting unit configured to set the booting register of the second core to be in the enable state in response to the transferring of the booting image of the second core to the second core via the network The boot loader of the second core may be included in the booting image of the second core, and the booting image of the second core may be recorded in a predetermined location of the second memory.

According to an aspect of still another exemplary embodiment, there is provided a second core connected to a first core, and the second core may include: a second memory mapped to a first memory of the first core and configured to load the booting image of the second core transferred from the first memory; a second boot loader execution unit configured to execute a boot loader of the second core included in the booting image of the second core in response to a booting register of the second core being set to be in an enable state by a booting register setting unit of the first core; and a second booting unit configured to boot a kernel of the second core based on the booting image of the second core.

The booting register of the second core may be set to be in the enable state in response to the transferring of the booting image of the second core from the first memory to the second memory.

The above embodiments may be implemented by using a system, a method, a computer program, or a combination thereof.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

As the inventive concept allows various changes and numerous embodiments, exemplary embodiments will be illustrated in the drawings and described in detail in the written description. Effect and features of the embodiments of the present inventive concept and a method of implementing the same will be clear with reference to the embodiments described in detail with accompanying drawings. The present embodiments may have different forms and should not be construed as being limited to the descriptions set forth herein. Expressions such as "at least one of," when preceding a list of elements, modify the entire list of elements and do not modify the individual elements of the list.

Hereinafter, the present embodiments will be described in detail with reference to the accompanying drawings, wherein like reference numerals refer to like elements throughout. The description of like elements will not be repeated.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise.

It will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

Figure 1:
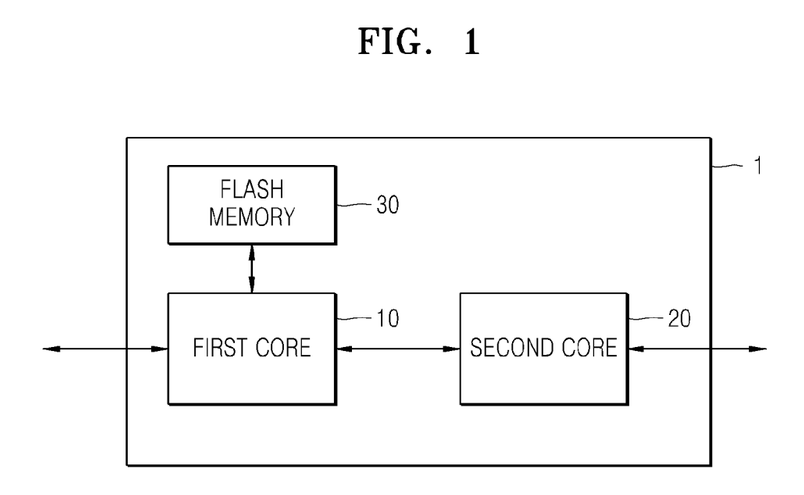
FIG. 1 is a block diagram of a configuration of a multisystem, according to an exemplary embodiment.

FIG. 1 is a block diagram of a configuration of a multisystem 1, according to an exemplary embodiment.

Referring to FIG. 1, the multisystem 1 according to an exemplary embodiment includes a first core 10, a second core 20, and a flash memory 30.

The multisystem 1 according to an embodiment includes a plurality of cores that may be independently operated. The plurality of cores may each include a central processing unit (CPU) and a memory. An operating system of each core may be independently operated and booted. That is, according to an exemplary embodiment, all cores in the multisystem 1 may be booted to operate the multisystem 1. However, the plurality of cores may be booted by using a single flash memory that is connected to any one of the plurality of cores.

The plurality of cores may communicate with each other via a network and function differently in a system. For example, if the multisystem 1 according to an exemplary embodiment is a surveillance system, the first core 10 may receive images from a camera and process the images, and the second core 20 may receive the images from the first core 10 via a network, process the images, and output the processed images via a display device. The network may be a wired network or a wireless network, and may be using, for example, the Peripheral Component Interconnect express (PCIe) standard.

The PCIe standard is a serial bus standard for data input and output which has been mainly created by Intel, Co. The PCIe standard is compatible with PCI buses at a software level, and supports various speeds up to 80 Gbps.

The flash memory 30 is a non-volatile memory in which data stored is not erased even when power is off. The flash memory 30 may be a NAND type or a NOR type. The flash memory 30 according to an exemplary embodiment stores booting images of the first and second cores 10 and 20.

Figure 2:
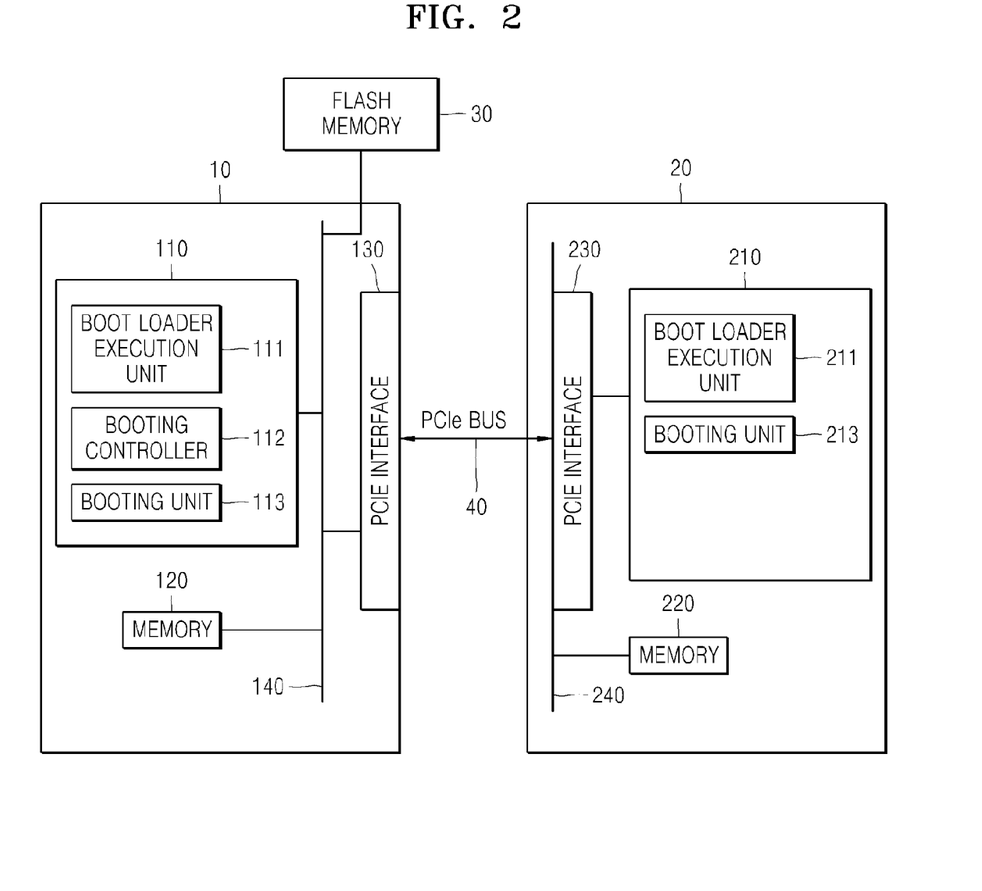
FIG. 2 is a detailed block diagram of the multisystem of FIG. 1, according to an exemplary embodiment.

FIG. 2 is a detailed block diagram of the multisystem of FIG. 1, according to an exemplary embodiment.

Referring to FIG. 2, each of the first and second cores 10 and 20 includes a CPU, a memory, and a system bus that connects the CPU and the memory. The first and second cores 10 and 20 may be connected to a PCIe bus 40 to communicate with each other. A memory 120 of the first core 10 and a memory 220 of the second core 20 may be connected to each other by the PCIe bus 40. Mapping information of the memory 120 and the memory 220 and other information necessary for communication may be stored in PCIe interfaces 130 and 230.

The first core 10 includes a CPU 110, the memory 120, the PCIe interface 130, and a system bus 140 that connects the CPU 110, the memory 120, and the PCIe interface 130. The flash memory 30 is connected to the system bus 140 of the first core 10. Although not illustrated in FIG. 2, an input/output (I/O) interface may be provided between the flash memory 30 and the system bus 140.

The CPU 110 includes a boot loader execution unit 111, a booting controller 112, and a booting unit 113.

The boot loader execution unit 111 executes a boot loader of the first core 10. The boot loader is a program that performs pre-processes so that an operating system is appropriately booted and the operating system may be uploaded in the memory. The boot loader may be a program such as Redboot, U-boot, or EZ boot.

When the power of the first core 10 is turned on, the boot loader execution unit 111 may load and execute a program located at a certain address of the flash memory 30. For example, the boot loader execution unit 111 may load a boot loader program from a certain address of the flash memory 30 to the memory 120 and execute the program.

The booting controller 112 controls booting preparation operations of the first core 10. The booting controller 112 loads a booting image of the first core 10. The booting controller 112 may transfer the booting image of the first core 10 into the memory 120. When a connection with the second core 20 is detected, the booting controller 112 may control not only the booting preparation operations of the first core 10 but also booting preparation operations of the second core 20. That is, the booting controller 112 may also load a booting image of the second core 20. The booting controller 112 may transfer the booting image of the second core 20 into the memory 220 of the second core 20. The functions of the booting controller 112 will be described in detail with reference to FIG. 3.

When the booting image of the first core 10 is loaded, the booting unit 113 boots a kernel of the first core 10 based on the loaded booting image of the first core 10. When the kernel is booted, the booting unit 113 may boot a file system of the first core 10. When a connection with the second core 20 is detected and thus the booting image of the second core 20 is transferred by the booting controller 112, the booting unit 113 may boot the kernel of the first core 10 after the booting image of the second core 20 is transferred.

The memory 120 is a main memory of the first core 10 and may be a random access memory (RAM). For example, the memory 120 may be a double data rate (DDR) memory, but this embodiment is not limited thereto.

The PCIe interface 130 is a type of a bus bridge that controls communication between the system bus 140 and the PCIe bus 40. Based on a communication protocol of the system bus 140 and a communication protocol of the PCIe bus 40, the PCIe interface 130 controls data transmitted between the system bus 140 and the PCIe bus 40.

The second core 20 includes a CPU 210, the memory 220, the PCIe interface 230, and a system bus 240 that connects the CPU 210, the memory 220, and the PCIe interface 230.

The CPU 210 includes a boot loader execution unit 211 and a booting unit 213.

The boot loader execution unit 211 is loaded by the booting controller 112 of the first core 10 and executes a boot loader from the booting image of the second core 20 stored in the memory 220. The boot loader execution unit 211 may be set to execute a file stored in a certain location of the memory 220, and the booting controller 112 of the first core 10 may store the boot loader of the second core 20 in the certain location of the memory 220.

The boot loader execution unit 211 may execute the boot loader when a booting register of the second core 20 is set to be in an enable state. Booting register values of the second core 20 may be set by the booting controller 112 of the first core 10.

The booting unit 213 boots a kernel of the second core 20 based on the booting image of the second core 20 that is loaded by the booting controller 112 of the first core 10 and stored in the memory 220. When the kernel is booted, various programs, including drivers, may be operated in the second core 20.

Hereinafter, the functions of the booting controller 112 of FIG. 2 will be described in detail with reference to FIG. 2.

Figure 3:
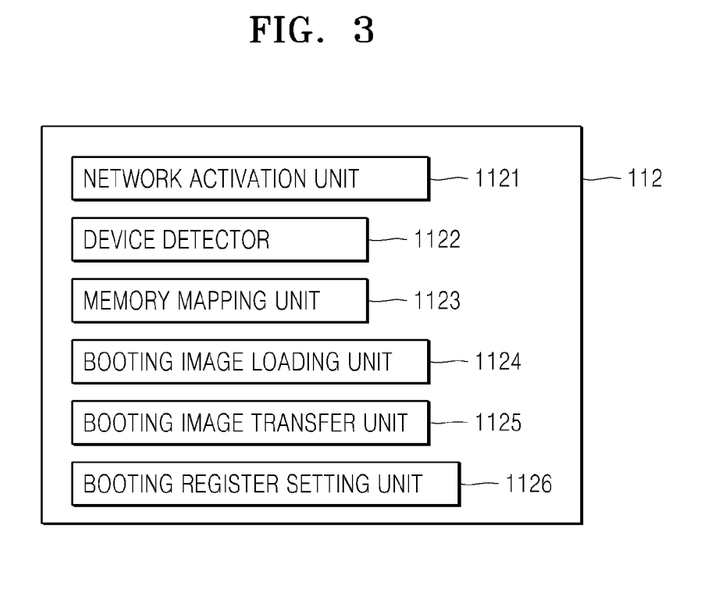
FIG. 3 is a view of a configuration of a booting control unit, according to an exemplary embodiment.

FIG. 3 is a view of a configuration of the booting control unit 112 of FIG. 2, according to an exemplary embodiment.

Referring to FIG. 3, the booting controller 112 according to an exemplary embodiment includes a network activation unit 1121, a device detector 1122, a memory mapping unit 1123, a booting image loading unit 1124, a booting image transfer unit 1125, and a booting register setting unit 1126.

The network activation unit 1121 sets the PCIe interface 130 of the first core 10 to be in an enable state. For example, the network activation unit 1121 may set an enable register value of the PCIe interface 130 of the first core 10 to be in the enable state. The network activation unit 1121 may also set the PCIe interface 230 of the second core 20 to be in the enable state. The network activation unit 1121 may convert the PCIe interface 230 of the second core 20 to the enable state by using BAR0 registers of the PCIe interfaces 130 and 230 that are connected to each other by hardware. Since the BAR0 registers are connected by hardware, the BAR0 registers may be used for data transmission before mapping memories.

The device detector 1122 may search for devices connected to the PCIe interface 130 of the first core 10, and may detect the second core 20 that is connected to the PCIe interface 130. The device detector 1122 output information regarding the second core 20 that is detected. If there is no device connected to the PCIe interface 130, the device detector 1122 outputs a log showing a connection failure.

When the second core 20 is detected by the device detector 1122, the memory mapping unit 1123 maps addresses of memories connected by the PCIe bus 40. For example, the memory mapping unit 1123 maps respective addresses of the memory 120 of the first core 10 and the memory 220 of the second core 20. The memory mapping unit 1123 may transmit mapping information to the second core 20 by using the BAR0 registers of the PCIe interfaces 130 and 230. The memory 120 and the memory 220 are connected to each other by software based on the mapping information.

The booting image loading unit 1124 loads the booting image of the first core 10 and the booting image of the second core 20 stored in the flash memory 30. For example, the booting image loading unit 1124 loads the booting image of the first core 10 and the booting image of the second core 20 into the memory 120. According to an exemplary embodiment, the booting image loading unit 1124 may store the booting image of the second core 20 at a certain location of the first core 10. The certain location may be a location of the memory 120 of the first core 10, which is mapped to a location of the memory 220 of the second core 20 which is predetermined to store the booting image of the second core 20.' For example, the certain location of the memory 120 may be a location of the memory 120 of the first core 10, which is mapped to a location of the memory 220 of the second core 20 read by a boot loader executed by the boot loader execution unit 211 of the second core 20.

The booting image transfer unit 1125 transfers the loaded booting image of the second core 20 to the second core 20 via the PCIe bus 40. For example, the booting image transfer unit 1125 may transfer the booting image of the second core 20, which is stored at the certain location of the memory 120 of the first core 10, to the second core 20 via the PCIe bus 40. The transferred booting image of the second core 20 may be stored at a location of the memory 220 of the second core 20, which is mapped to the certain location of the memory 120 of the first core 10 according to memory mapping information.

When the booting image of the second core 20 is transferred, the booting register setting unit 1126 may set the booting register of the second core 20 to be in the enable state. When the booting register of the second core 20 is converted to the enable state, the second core 20 starts booting based on the transferred booting image.

Figure 4:
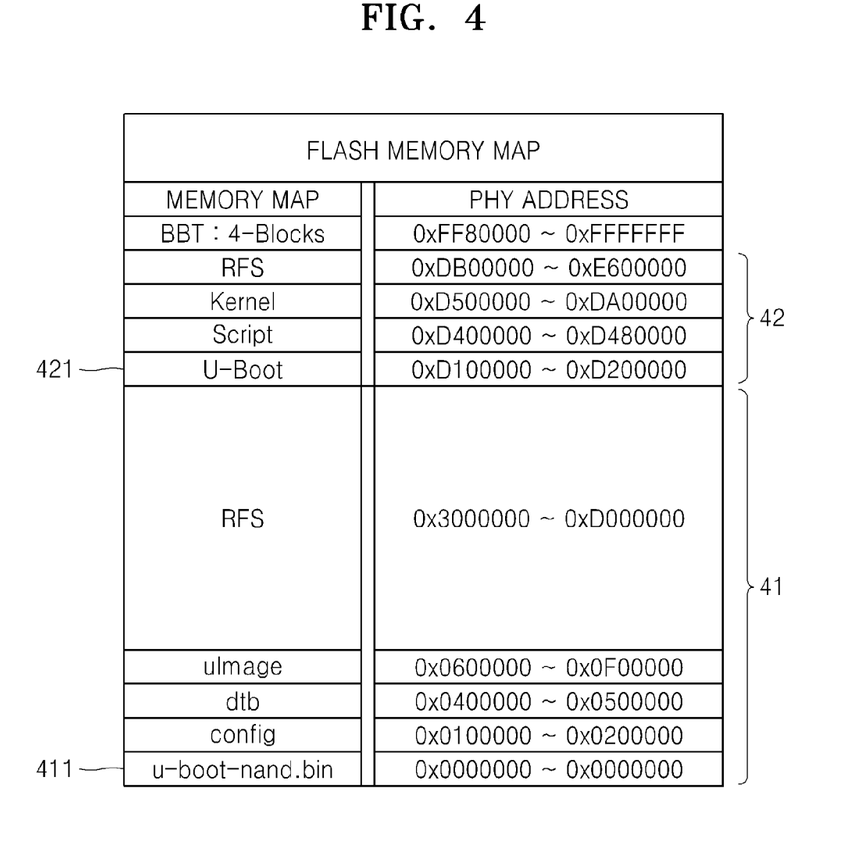
FIG. 4 is a view of a flash memory map according to an exemplary embodiment.

FIG. 4 is a view of a flash memory map according to an exemplary embodiment.

Referring to FIG. 4, the flash memory 30 stores booting images 41 of the first core 10 and booting images 42 of the second core 20. The booting images include information necessary for booting, a boot loader, a kernel image, a script, file system image, and the like. The kernel image includes information for booting a kernel. The script may include setting information executed while the boot loader is being booted, a locations in a memory for loading a file system and the kernel image, and the like.

Although FIG. 4 shows actual file names of the booting images 41, the file names are only examples and the embodiments are not limited thereto. Also, dtb in the booting images 41 may be omitted according to a core type.

Referring to FIG. 4, a first address of the flash memory 30 stores a boot loader 411 of the first core 10. When power of the first core 10 is turned on, the boot loader execution unit 111 loads a file at the first address of the flash memory 30 into the memory 120 and then executes the file.

When the boot loader 411 of the first core 10 is executed and then memory mapping is finished, the booting image loading unit 1124 loads the booting images 41 of the first core 10 and the booting images 42 of the second core 20 into the memory 120. In this case, since the boot loader 411 of the first core 10 is already loaded by the boot loader execution unit 111, the booting image loading unit 1124 may load images other than the boot loader 411 from the booting images 41 of the first core 10. However, the booting images 42 of the second core 20 are all loaded, including a boot loader 421.

If a connection with the second core 20 is not detected and thus memories are not mapped, the booting image loading unit 1124 may only load the booting images 41 of the first core 10 and omit loading of the booting images 42 of the second core 20.

Referring to FIG. 4, the first address of the flash memory 30 stores "u-boot" that is the boot loader 411 of the first core 10. The u-boot of the first core 10 is loaded by the boot loader execution unit 111 into the memory 120 and then executed.

Figure 5:
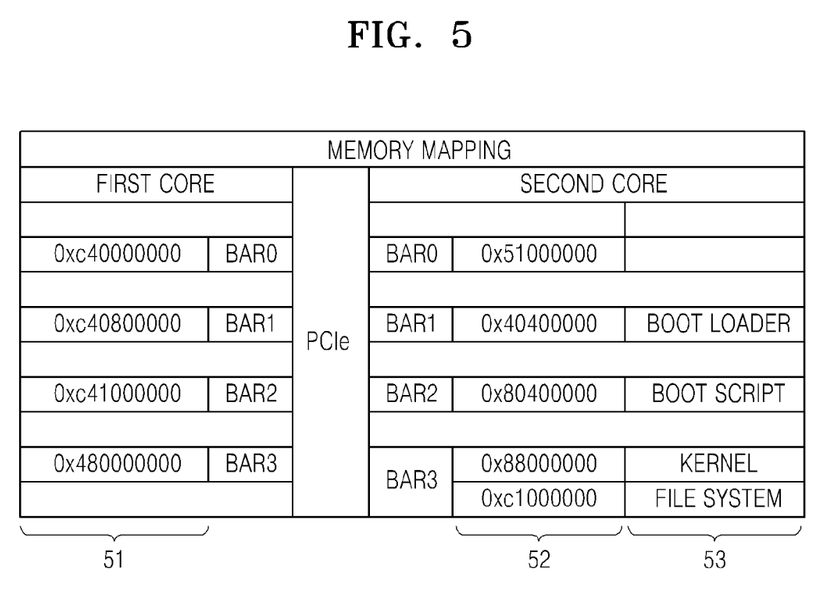
FIG. 5 is a view of an example of a memory mapping, according to an exemplary embodiment.

FIG. 5 is a view of an example of a memory mapping, according to an exemplary embodiment.

FIG. 5 illustrates an example in which addresses 51 of the memory 120 of the first core 10 and addresses 52 of the memory 220 of the second core 20 are mapped to each other by the memory mapping unit 1123. Referring to FIG. 5, images 53 to be stored in the addresses 52 of the memory 220 are shown.

Referring to FIG. 5, booting images of the second core 20 are transferred from the memory 120 of the first core 10 into the memory 220 of the second core 20 via a PCIe bus. Specifically, the booting image loading unit 1124 of the first core 10 records the booting images of the second core 20 at locations of the memory 120 which correspond to BAR1, BAR2, and BAR3 of the PCIe bus. According to the memory mapping, the booting image transfer unit 1125 transmits data, which is recorded at the locations of the memory 120 allocated to BAR1, BAR2, and BAR3, via the PCIe bus. The transmitted data is identically recorded at locations of the memory 220 which are allocated to BAR1, BAR2, and BAR3.

Referring FIG. 5, when a boot loader of the second core 20 is stored at a location of 0x40400000 of the memory 220 and a booting register of the second core 20 is converted to an enable state, the boot loader execution unit 211 may execute the boot loader that is stored at the location of 0x40400000 of the memory 220.

Figure 6:
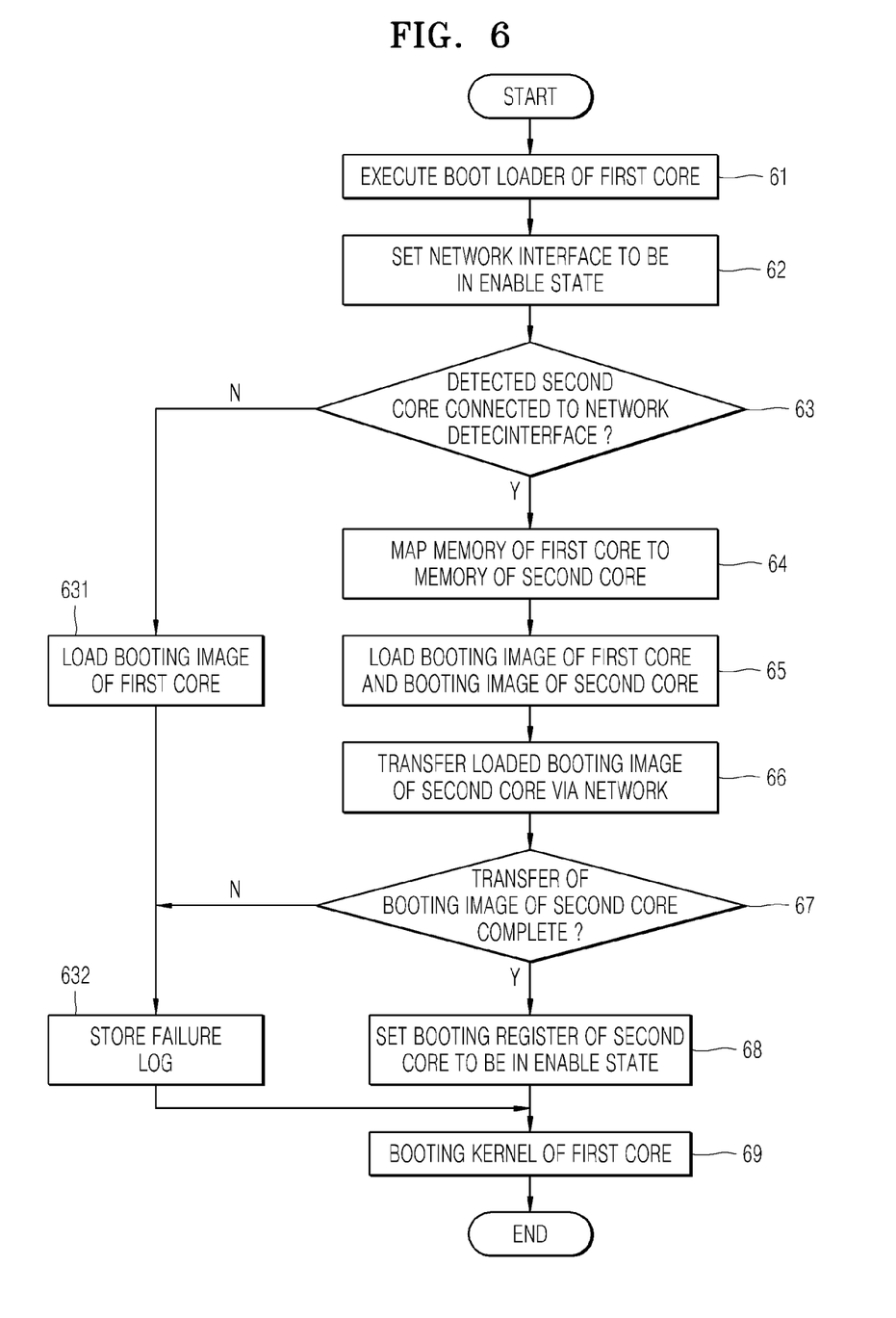
FIG. 6 is a flowchart of a method of booting a multisystem executed in a first core, according to an exemplary embodiment.

FIG. 6 is a flowchart of a method of booting a multisystem executed in a first core, according to an exemplary embodiment.

Referring to FIG. 6, in operation 61, a boot loader execution unit executes a boot loader of the first core.

In operation 62, a network activation unit sets a network interface to be in an enable state. For example, in operation 62, the network activation sets a PCIe interface of the first core and a PCIe interface of a second core to be in the enable state. The network activation unit may set an enable register of the PCIe interface of the second core by using BAR0 registers of the PCIe interfaces that are connected to each other by hardware.

In operation 63, a device detector detects the second core that is connected to the network interface. If the second core is detected in operation 63, the method proceeds to operation 64; if not, the method proceeds to operation 631.

In operation 64, a memory mapping unit maps a memory of the first core and a memory of the second core. Mapping information may be transmitted to the second core by using BAR0 registers of the PCIe interfaces that are connected by hardware. Based on the mapping information, the memory of the first core and the memory of the second core may be mapped by software.

In operation 65, a booting image loading unit loads a booting image of the first core and a booting image of the second core. In operation 65, the booting image loading unit may load the booting image of the first core and the booting image of the second core into the memory of the first core from a flash memory. In this case, since the boot loader of the first core may have already been loaded by the boot loader execution unit, the booting image loading unit may omit loading the boot loader from the booting images of the first core.

According to an exemplary embodiment, in operation 65, the booting image loading unit may load the booting image of the second core to a certain location of the memory of the first core. The certain location may be a location of the memory of the first core, which is mapped to a location of the memory of the second core which is predetermined to store the booting image of the second core.

In operation 66, a booting image transfer unit transfers the booting image of the second core loaded into the memory of the second core in operation 65. Specifically, in operation 66, the booting image transfer unit records the booting image of the second core, which is loaded to the certain location of the first core, at a location of the memory of the second core which is mapped to the certain location of the memory of the first core. Thus, the booting image of the second core may be transferred to the second core via a network (for example, a PCIe network).

In operation 67, the booting image transfer unit determines whether the transferring of the booting image is complete or not. If the transferring of the booting image is complete, the method proceeds to operation 68; if not, that is, if the transfer has failed, the method proceeds to operation 632.

In operation 68, a booting register setting unit converts a booting register of the second core to an enable state. The second core starts booting when the booting register is converted to the enable state.

In operation 69, a booting unit boots a kernel of the first core.

If the second core is not detected in operation 63, the method proceeds to operation 631. In operation 631, the booting image loading unit loads the booting image of the first core. In operation 632, a booting controller stores a failure log. The failure log may be output on a screen during a process of booting the first core. If the transferring of the booting image has failed in operation 67, the method also proceeds to operation 632, and the booting controller stores the failure log.

When the failure log is stored in operation 632, the method proceeds to operation 69, and the kernel of the first core is booted.

When the first core is booted, programs are operated in the first core.

Figure 7:
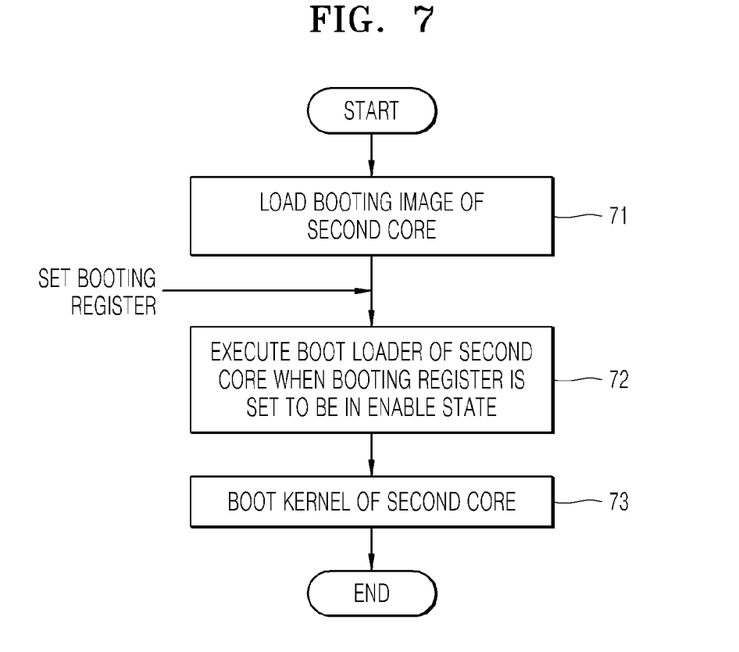
FIG. 7 is a flowchart of a method of booting a multisystem executed in a second core, according to an exemplary embodiment.

FIG. 7 is a flowchart of a method of booting a multisystem executed in a second core, according to an embodiment.

Referring to FIG. 7, in operation 71, a booting image of the second core is loaded to a memory of the second core. In particular, a booting image transfer unit of a first core loads the booting image of the second core into the memory of the second core.

When the loading of the booting image of the second core is complete, a booting register setting unit of the first core sets a booting register of the second core to be in an enable state.

In operation 72, when the booting register is set to be in the enable state, a boot loader execution unit of the second core executes a boot loader of the second core that is loaded into the memory of the second core. The booting image stored in operation 71 includes the boot loader. In particular, the boot loader execution unit 211 executes the boot loader of the second core which is stored in the booting image of the second core which is recorded at a predetermined location of the memory of the second core.

In operation 73, a booting unit of the second core boots a kernel of the second core.

When the second core is booted, programs are operated in the second core.

The methods of booting the multisystem shown in FIGS. 6 and 7 may be recorded in a program that may be executed in a computer, and may be implemented in a universal digital computer that executes the program by using a computer-readable recoding medium. Examples of the computer-readable recoding medium include magnetic storage media (e.g., ROM, floppy disks, or hard disks) and optical recording media (e.g., CD-ROMs or DVDs).

At least one of the components, elements or units represented by a block as illustrated in FIGS. 1-3 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a processor that performs a corresponding function. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

According to the above exemplary embodiments, a method of booting cores in a multisystem including at least two cores uses one flash memory, and thus, the method is cost efficient and may be easily managed. According the above exemplary embodiments, the method of booting cores in a multisystem including at least two cores starts booting a core before a booting of another core is finished, and thus, the entire system may be quickly booted.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. A method performed by a first core to boot multisystem comprising the first core and a second core, the method comprising:
   executing a boot loader of the first core;
   setting a network interface of the first core to be in an enable state;
   detecting the second core that is connected to the network interface of the first core;
   mapping a first memory of the first core to a second memory of the second core;
   loading a booting image of the first core and a booting image of the second core on the first memory; and
   transferring the booting image of the second core loaded on the first memory to the second core via a network,
   wherein the first memory is a volatile memory.

2. The method of claim 1, wherein the network is a Peripheral Component Interconnect express (PCIe) network.

3. The method of claim 1, further comprising setting a booting register of the second core to be in an enable state in response to the transferring.

4. The method of claim 1, further comprising booting a kernel of the first core in response to the transferring.

5. The method of claim 4, wherein the booting comprises:
   if the second core is detected, booting the kernel of the first core in response to the transferring; and if the second core is not detected, booting the kernel of the first core in response to the loading.

6. The method of claim 1, wherein the loading comprises loading the booting image of the second core into a predetermined location of the first memory, and
wherein the transferring comprises transferring the booting image of the second core by recording the booting image of the second core, which is loaded into the predetermined location of the first memory, to a predetermined location of the second memory which is mapped to the predetermined location of the first memory.

7. The method of claim 1, wherein the multisystem further comprises another memory, and
wherein the loading comprises loading the booting image of the first core and the booting image of the second core from the other memory.

8. A non-transitory computer-readable recording medium having recorded thereon a program, which, when executed by a computer, performs the method of claim 1.

9. The method of claim 1, further comprising sending to the second core mapping information showing a mapping relationship of memory addresses between the first memory and the second memory.

10. A first core connected to a second core, the first core comprising:
a first boot loader execution unit configured to execute a boot loader of the first core;
a network activation unit configured to set a network interface of the first core to be in an enable state;
a device detector configured to detect the second core that is connected to the network interface of the first core;
a memory mapping unit configured to map a first memory of the first core to a second memory of the second core;
a booting image loading unit configured to load a booting image of the first core and a booting image of the second core on the first memory; and
a booting image transfer unit configured to transfer the booting image of the second core loaded on the first memory to the second core via a network,
wherein the first memory is a volatile memory.

11. The first core of claim 10, wherein the network is a Peripheral Component Interconnect express (PCIe) network.

12. The first core of claim 10, further comprising a booting register setting unit configured to set a booting register of the second core to be in an enable state in response to the transferring of the booting image of the second core to the second core via the network.

13. The first core of claim 10, further comprising a first booting unit configured to boot a kernel of the first core based on the booting image of the first core.

14. The first core of claim 13, wherein, if the second core is detected by the device detector, the first booting unit boots the kernel of the first core in response to the transferring the booting image of the second core to the second core, and
wherein if the second core is not detected by the device detector, the first booting unit boots the kernel of the first core after loading the booting image of the first core.

15. The first core of claim 10, wherein the booting image loading unit is configured to load the booting image of the second core into a predetermined location of the first memory, and
wherein the booting image transfer unit is configured to transfer the booting image of the second core by recording the booting image of the second core, which is loaded into the predetermined location of the first memory, to a predetermined location of the second memory which is mapped to the predetermined location of the first memory.

16. The first core of claim 15, wherein information about mapping between the first memory and the second memory is stored in the network interface of the first core.

17. A multisystem comprising
the first core of claim 10; and
the second core comprising:
a second boot loader execution unit configured to execute a boot loader of the second core included in the booting image of the second core in response to a booting register of the second core being set to be in an enable state; and
a second booting unit configured to boot a kernel of the second core based on the booting image of the second core,
wherein the first core further comprises a booting register setting unit configured to set the booting register of the second core to be in the enable state in response to the transferring of the booting image of the second core to the second core via the network.

18. The multisystem of claim 17, wherein the boot loader of the second core is included in the booting image of the second core, and
wherein the booting image of the second core is recorded in a predetermined location of the second memory.

19. The multisystem of claim 18, wherein the multisystem further comprises another memory, and
wherein the booting image loading unit is configured to load the booting image of the first core and the booting image of the second core from the other memory.

20. A second core connected to a first core, the second core comprising:
a second memory mapped to a first memory of the first core and configured to load the booting image of the second core transferred from the first memory;
a second boot loader execution unit configured to execute a boot loader of the second core included in the transferred booting image of the second core in response to a booting register of the second core being set to be in an enable state by a booting register setting unit of the first core; and
a second booting unit configured to boot a kernel of the second core based on the booting image of the second core,
wherein the first memory is a volatile memory.

21. The second core of claim 20, wherein the booting register of the second core is set to be in the enable state in response to the transferring of the booting image of the second core from the first memory to the second memory.

* * * * *